(No Model.)
T. H. BRIGG.
MEANS FOR CONNECTING DRAFT ANIMALS TO VEHICLES.
No. 596,569. Patented Jan. 4, 1898.
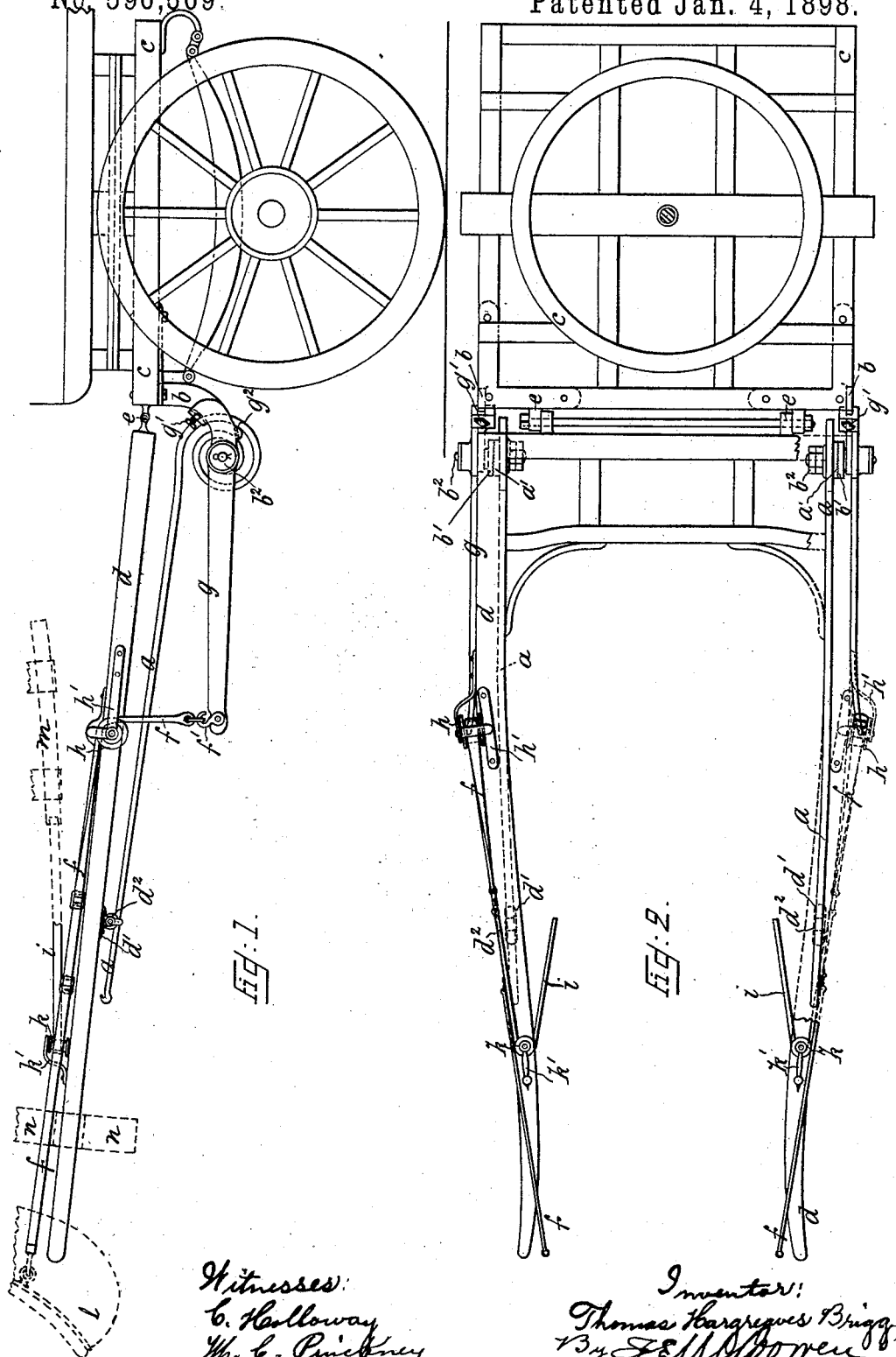

UNITED STATES PATENT OFFICE.

THOMAS HARGREAVES BRIGG, OF BRADFORD, ENGLAND.

MEANS FOR CONNECTING DRAFT-ANIMALS TO VEHICLES.

SPECIFICATION forming part of Letters Patent No. 596,569, dated January 4, 1898.

Application filed September 22, 1897. Serial No. 652,522. (No model.) Patented in France April 6, 1897, No. 265,712.

*To all whom it may concern:*

Be it known that I, THOMAS HARGREAVES BRIGG, a subject of the Queen of Great Britain and Ireland, residing at Bradford, Yorkshire, England, have invented certain new and useful Improved Means for Connecting Draft-Animals to Vehicles and the Like, (for which I have obtained a patent in France, No. 265,712, dated April 6, 1897,) of which the following is a specification.

This invention relates to improved means of carrying out the system of connecting draft-animals to vehicles, ground implements, and the like having fore and aft axles and wheels or other fore and aft bearings upon the ground described in the specification of my Patent No. 486,837, granted November 22, 1892, in which system the coöperation of two oppositely-acting forces brought to bear on the animal's fore quarters is effective in automatically determining and giving the animal the benefit of the most effective angle of draft at each moment of its progress. In the means of carrying out such system described in the specification of such patent the supporting force is applied through the shafts and the downwardly-bearing force is applied through separate traces in no way connected to the shafts. In the present means both the automatically-operating lifting force and also the counter-operating force brought into action by the draft of the animal operate directly through the shafts, through which, by means of the ordinary belly and back bands, the resultant force is applied to the animal, and the device also operates, through a deflected breech-strap connected to the shafts, in transferring part of the weight of the load onto the animal's hind quarters when the animal is backing, the operative parts of the device being adapted to coöperate in the improved manner hereinafter described.

In the accompanying drawings, Figure 1 represents a side elevation of the fore part of a two-axled wheeled vehicle having a fore-carriage $c$ and shafts $d$ pivotally connected to the fore part thereof at $e$ in an ordinary manner and connected to belly and back bands $n$, showing the vehicle as adapted with the present improved draft device. Fig. 2 represents a sectional plan with the body part of the vehicle removed.

In the improved means the shaft-lifting springs $a$ and also the means $g$ by which the traces are connected to the vehicle are applied, each in an adjustable manner, to depending brackets $b$, common thereto and secured to the fore part of the fore-carriage $c$, and the means $d^2 \, h \, k$, respectively, for taking the thrust of the lifting-springs for deflecting the traces between and above their points of attachment to the animal at the collar and to the vehicle at their rear ends and for deflecting the breeching between and forwardly of its attachments to the traces and its passing behind the animal are all applied directly to and at respectively appropriate parts of the shafts, which, as aforesaid, remain pivotally attached to the fore-carriage at $e$ in an ordinary manner.

The springs $a$ are adjustably applied to the brackets $b$ by opposite clutch-plates $a' \, b'$ and bolts and nuts $b^2$, so as to permit of their lifting force being conveniently adjusted as circumstances may require. The free end of each spring engages with and applies its lifting thrust to the under side of a grooved roller $d^2$, mounted in a bearing $d'$, secured to the under side of a forward part of the shaft $d$ in such manner as, when the animal is disconnected from the vehicle, to permit of the shafts being turned up about their pivotal connection to the fore-carriage without interference with or by the springs.

$f$ represents the traces through which the force acting counter to that of the springs $a$ is applied to the shafts $b$, and each of which traces is connected to the vehicle by being hooked at $f'$ to the fore arm of a lever $g$, which is supported by the same bracket $b$ that supports its respective shaft-lifting spring $a$, the rear arm of the lever being adapted to engage in an adjustable manner (by means of an adjusting-screw $g'$ or otherwise) with the bracket, so as to obtain a bearing thereagainst when the connected animal is in draft, and is also adapted at $g^2$ to engage with the bracket, so as to prevent the fore arm of the lever from falling when the animal is at a standstill. The trace extends from its connection to the lever over a deflecting-pulley $h$, supported below or at the side of the shaft by a bearing $h'$, secured thereto, and is connected at its forward end to the animal at the collar $l$ in a usual manner.

When the device is applied to heavy vehicles and is arranged so as, with the object aforesaid, to be also operative in transferring part of the weight of the load onto the animal when the latter is backing, a connection $i$ from each trace $f$ to the breech-strap $m$, which goes behind the animal, is deflected forwardly by a roller $k$, supported in a bearing $k'$, secured to the upper part of a forward part of the shaft.

The improved hauling device may be applied without any connection with the breech-strap in light vehicles wherein the connection is not required.

I claim as my invention in appliances for connecting draft-animals to vehicles and the like of the nature aforesaid, in which a supporting force and a counteracting downwardly-bearing force are caused to coöperate for the purposes aforesaid—

1. The combination of adjustable springs $a$, and levers $g$, carried by brackets $b$, applied to the fore-carriage; spring bearing-pulleys $d^2$, trace-deflecting pulleys $h$, and breech-strap-deflecting pulleys $k$, applied to shafts pivoted at $e$, to the fore part of the fore-carriage; and traces $f$, connected to the levers $g$, and to the animal at the collar and deflected by the pulleys $h$, and breech connections $i$, connected to the traces and deflected by the pulleys $k$, and belly and back bands $n$, by which the resultant lifting or downbearing force operating through the ordinary shafts $d$, is applied to the animal, as set forth.

2. The combination of adjustable springs $a$, and levers $g$, carried by brackets $b$, applied to the fore-carriage; spring bearing-pulleys $d^2$, and trace-deflecting pulleys $h$, applied to shafts pivoted at $e$, to the fore part of the fore-carriage; and traces $f$, connected to the levers $g$, and to the animal at the collar and deflected by the pulleys $h$; and belly and back bands $n$, by which the resultant lifting or downbearing force operating through the ordinary shafts $d$, is applied to the animal, as set forth.

Signed at London, England, this 3d day of September, 1897.

THOMAS HARGREAVES BRIGG.

Witnesses:
 CHAS. AUBREY DAY,
 ALFRED CHARLES DAY.